United States Patent
Yan

(10) Patent No.: US 10,289,334 B2
(45) Date of Patent: May 14, 2019

(54) VALID DATA MERGING METHOD, MEMORY CONTROLLER AND MEMORY STORAGE APPARATUS

(71) Applicant: PHISON ELECTRONICS CORP., Miaoli (TW)

(72) Inventor: Horng-Sheng Yan, Penghu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 512 days.

(21) Appl. No.: 14/986,733

(22) Filed: Jan. 4, 2016

(65) Prior Publication Data

US 2017/0115925 A1 Apr. 27, 2017

(30) Foreign Application Priority Data

Oct. 23, 2015 (TW) .............................. 104134800 A

(51) Int. Cl.
*G06F 3/06* (2006.01)

(52) U.S. Cl.
CPC .......... *G06F 3/0638* (2013.01); *G06F 3/0604* (2013.01); *G06F 3/065* (2013.01); *G06F 3/0652* (2013.01); *G06F 3/0679* (2013.01)

(58) Field of Classification Search
CPC ...... G06F 3/0638; G06F 3/0604; G06F 3/065; G06F 3/0652; G06F 3/0679
See application file for complete search history.

(56) References Cited

U.S. PATENT DOCUMENTS

| | | | | |
|---|---|---|---|---|
| 2005/0144358 A1* | 6/2005 | Conley | ............... | G06F 12/0246 711/103 |
| 2009/0193191 A1* | 7/2009 | Bae | ..................... | G06F 12/0246 711/115 |
| 2010/0293321 A1* | 11/2010 | Weingarten | ......... | G06F 12/0246 711/103 |
| 2014/0019670 A1* | 1/2014 | Huang | ................ | G06F 12/0246 711/103 |

* cited by examiner

*Primary Examiner* — Reginald G Bragdon
*Assistant Examiner* — Mehdi Namazi
(74) *Attorney, Agent, or Firm* — JCIPRNET

(57) ABSTRACT

A valid data merging method, a memory controller and a memory storage apparatus are provided. The method includes: grouping physical erasing units in a data area to at least a first group and a second group; selecting a first physical erasing unit from the second group; and copying valid data of the first physical erasing unit to a second physical erasing unit. A trim table recording special type data of the physical erasing units of the first group is not stored in a non-volatile rewriteable memory module, and a trim table recording special type data of the physical erasing units of the second group is stored in the non-volatile rewriteable memory module. The valid data does not include the special type data of the first physical erasing unit.

18 Claims, 18 Drawing Sheets

| Logical address | Type of special type data |
|---|---|
| LBA(0)-0 | 1 |
|  |  |
|  |  |

FIG. 9B

| Logical address | Type of special type data |
|---|---|
| LBA(0)-0 | 1 |
| LBA(1)-0 | 2 |
| LBA(1)-1 | 1 |

FIG. 10B

| Logical address | Type of special type data |
|---|---|
|  |  |
|  |  |
|  |  |

FIG. 11B

| Logical address | Type of special type data |
|---|---|
|  |  |
|  |  |
|  |  |

VALID DATA MERGING METHOD, MEMORY CONTROLLER AND MEMORY STORAGE APPARATUS

CROSS-REFERENCE TO RELATED APPLICATION

This application claims the priority benefit of Taiwan application serial no. 104134800, filed on Oct. 23, 2015. The entirety of the above-mentioned patent application is hereby incorporated by reference herein and made a part of this specification.

BACKGROUND

1. Technology Field

The present invention is directed to a valid data merging method for a rewritable non-volatile memory, and a memory controller and a memory storage apparatus using the method.

2. Description of Related Art

Along with the widespread of digital cameras, cell phones, and MP3 players in recently years, the consumers' demand to storage media has increased drastically. Because a rewritable non-volatile memory is capable of providing features such as data non-volatility, low power consumption, small volume, and non-mechanical structure, high reading and writing speed, the rewritable non-volatile memory has become the most adaptable memory applied in a portable electronic product, e.g., a notebook computer. A solid state drive (SSD) is a storage apparatus which utilizes a flash memory as its storage medium. Therefore, the flash memory industry has become a very popular part of the electronic industry in recent years.

A flash memory module has a plurality of physical erasing units, and each physical erasing unit has a plurality of physical programming units. When writing data into the physical erasing units, the data has to be written according to a sequence of the physical programming units. Moreover, the physical programming units already written with data must be erased before it can be used again for writing data. Specifically, a physical erasing unit is the smallest unit for erasing, and a physical programming unit is the smallest unit for programming (i.e., writing). Therefore, in the management of the flash memory module, the physical erasing units may be divided into a data area and a spare area.

The physical erasing units in the data area are configured to store data stored by a host system. In particular, a memory management circuit in the memory storage apparatus converts logical access addresses to be accessed by the host system into logical pages of logical blocks, and maps the logical pages of the logical blocks to the physical programming units of the physical erasing units in the data area. Namely, in the management of the flash memory module, the physical erasing units of the data area are regarded as the physical erasing units already being used (e.g., already stored with data written by the host system). For example, the memory management circuit uses a logical address-physical address mapping table for recording mapping relations between the logical pages and the physical programming units in the data area.

The physical erasing units of the spare area are used to alternatively replace the physical erasing units in the data area. More specifically, as described above, the physical erasing units written with data must be erased before it can be used again for writing data. Therefore, the physical erasing units of the spare area are designed to replace the physical erasing units mapped to the logical blocks for writing update data. Accordingly, the physical erasing units in the spare area are empty or the physical erasing units that can be used for writing data.

In a common writing operation, the memory management circuit writes update data into a physical erasing unit (which is also referred to as an active physical erasing unit) in the spare area and only at the appropriate time (e.g., when the host system is in an idle time), the memory management circuit loads the corresponding logical address-physical address mapping table to update the mapping information between the logical pages and the physical programming units and associates the active physical erasing unit with the data area.

More specifically, in a memory storage apparatus with a trim table, the trim table may be configured to record corresponding information between special type data in the data area and a logical access address (or a logical page). In particular, the physical programming units of each physical erasing unit in the data area may be respectively configured to store write data from the host system, and the write data may be general type data or special type data.

However, it should be noted that in the memory storage apparatus with the trim table, when the number of empty physical erasing units in the spare area is not greater than a predefined value, the memory management circuit performs a valid data merging operation. To be specific, when the number of the physical erasing units in the spare area is not greater than the predefined value, it represents that the physical erasing units in the spare area which can be used for writing are not enough. In this circumstance, the memory management circuit first correspondingly stores the information recorded in the trim table to the rewriteable non-volatile memory module. Then, the memory management circuit selects one or more physical erasing units from the data area and copies valid data of the selected one or more physical erasing units to a physical erasing unit in the spare area. Thereafter, the memory management circuit performs an erasing operation on the selected one or more physical erasing units in the data area, associates the physical erasing units to the spare area and associates the physical erasing unit storing the valid data from the spare area to the data area.

After the valid data merging operation is performed, if the host system is to access the special type data, the memory management circuit identifies a string arrangement of the special type data from the rewriteable non-volatile memory module according to the logical access address from the host system and replies the host system of the string arrangement of the special type data. By storing the string arrangement of the special type data in the trim table, the special type data does not have to be stored in the physical erasing unit, such that capacities of the physical erasing units available for storing other general type data can be increased.

Nevertheless, in the memory storage apparatus with the trim table, the host system still can perform the writing operation to write the update data into the active physical erasing unit in the spare area while performing the valid data merging operation. Specifically, while the host system performs the writing operation, the memory management circuit records the corresponding information between all the special type data in the data area and the logical access addresses (or the logical pages) in the trim table and selects one or more physical erasing units from the data area. Then, the memory management circuit copies the valid data of the selected one or more physical erasing units to N physical erasing units in the spare area. Then, the memory management circuit performs an erasing operation on the selected one or more physical erasing units in the data area and associates the physical erasing units to the spare area. Lastly, the memory management circuit associates the N physical erasing units storing the valid data from the spare area with the data area to complete the valid data merging operation. It should be noted that N is a non-zero positive integer, and N represents the minimum number of the physical erasing units in the spare area for writing the valid data from the data area when the valid data merging operation is completed, which allows an additional empty physical erasing unit to be generated in the spare area after the valid data merging operation ends. In other words, corresponding to an active physical erasing unit used by the writing operation of the host system, the memory management circuit may write the valid data from the selected one or more physical erasing units in the data area into the N physical erasing units in the spare are, so as to generate an additional empty physical erasing unit in the spare area after the valid data merging operation is performed to maintain number of the empty physical erasing units in the spare area.

In other words, as N becomes smaller, it represents that the valid data merging operation, the additional empty physical erasing unit is generated in the spare area with the valid data from the data area stored by using fewer physical erasing units in the spare area. Namely, as N becomes smaller, it represents that the less the valid data in the physical erasing units in the data area which are selected for the valid data merging operation is, the smaller the number of the valid data copied by the memory management circuit is, such that the memory management circuit has relatively good performance. On the contrary, as N becomes greater, it represents the valid data merging operation, the additional empty physical erasing unit is generated in the spare area with the valid data from the data area being stored by using more physical erasing units in the spare area. Namely, as N becomes smaller, it represents that the more the valid data in the physical erasing units in the data area which are selected for the valid data merging operation is, the greater the number of the valid data copied by the memory management circuit is, such that the memory management circuit has relatively poor performance.

However, since the memory management circuit correspondingly stores the corresponding information between all the special type data and the logical access addresses (or logical pages) of the trim table in the rewritable non-volatile memory every time when performing the valid data merging operation, the smaller value of N may otherwise results in the trim table being frequently stored which causes reduction in the performance of the memory management circuit. Therefore, how to reduce the times of storing the trim table while performing the valid data merging operation to enhance the performance of the memory management circuit is a goal for technicians of the art to achieve.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a valid data merging method, a memory controller and a memory storage apparatus, capable of effectively reducing times of storing a trim table while a valid data merging operation is performed.

According to an exemplary embodiment, a valid data merging method for a rewriteable non-volatile memory module is provided. The rewriteable non-volatile memory module has a plurality of physical erasing units, each physical erasing unit has a plurality of physical programming units, and the physical erasing units are grouped into at least a data area and a spare area. The valid data merging method includes grouping the physical erasing units in the data area into a first group and a second group, wherein a trim table recording at least one special type data of the physical erasing units of the first group is not stored in the rewriteable non-volatile memory module, and a trim table recording at least one special type data of the physical erasing units of the second group is stored in the rewriteable non-volatile memory module. The method also includes selecting a first physical erasing unit from the second group; copying valid data of the first physical erasing unit to a second physical erasing unit among the physical erasing units in the spare area; and performing an erasing operation on the first physical erasing unit.

According to an exemplary embodiment, a memory controller for controlling a rewriteable non-volatile memory module non-volatile memory module is provided. The rewriteable non-volatile memory module has a plurality of physical erasing units, each physical erasing unit has a plurality of physical programming units, and the physical erasing units are grouped into at least a data area and a spare area. The memory controller includes a host interface configured to couple to a host system; a memory interface configured to couple to the rewritable non-volatile memory module; and a memory management circuit coupled to the host interface and the memory interface. The memory management circuit is configured to group the physical erasing units in the data area to at least a first group and a second group, wherein a trim table recording at least one special type data of the physical erasing units of the first group is not stored in the rewriteable non-volatile memory module, and a trim table recording the at least one special type data of the physical erasing units of the second group is stored in the rewriteable non-volatile memory module. Additionally, the memory management circuit is further configured to select a first physical erasing unit from the second group, copy valid data of the first physical erasing unit to a second physical erasing unit among the physical erasing units in the spare area and perform an erasing operation on the first physical erasing unit.

According to an exemplary embodiment, a memory storage apparatus is provided. The memory storage apparatus includes a connector configured to couple to a host system, a rewriteable non-volatile memory module and a memory controller. The rewriteable non-volatile memory module has a plurality of physical erasing units, and each physical erasing unit has a plurality of physical programming units. The memory controller is coupled to the connector and the rewriteable non-volatile memory module. The memory controller is configured to group the physical erasing units in the data area to at least a first group and a second group, wherein a trim table recording at least one special type data of the physical erasing units of the first group is not stored in the rewriteable non-volatile memory module, and a trim table recording the at least one special type data of the physical erasing units of the second group is stored in the rewriteable non-volatile memory module. Additionally, the memory controller is further configured to select a first physical erasing unit from the second group, copy valid data of the first physical erasing unit to a second physical erasing unit among the physical erasing units in the spare area and perform an erasing operation on the first physical erasing unit.

To sum up, in the invention, the physical erasing units of the data area in the memory controller (or the memory management circuit) are divided into the first group and the second group, and therein, the trim table recording the special type data of the physical erasing units of the first group is not stored in the rewriteable non-volatile memory module, but the trim table recording the special type data of the physical erasing units of the second group is stored in the rewriteable non-volatile memory module. When the valid data merging operation is performed, the memory controller (or the memory management circuit) selects the physical erasing units for performing the valid data merging operation only from the second group to reduce the times of storing the trim table when the valid data merging operation is performed, so as to solve the problem that the trim table is frequently stored during the valid data merging operation.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10A to FIG. 13B illustrate simplified examples of performing the valid data merging operation and storing trim table.

DESCRIPTION OF THE EMBODIMENTS

Figure 1:
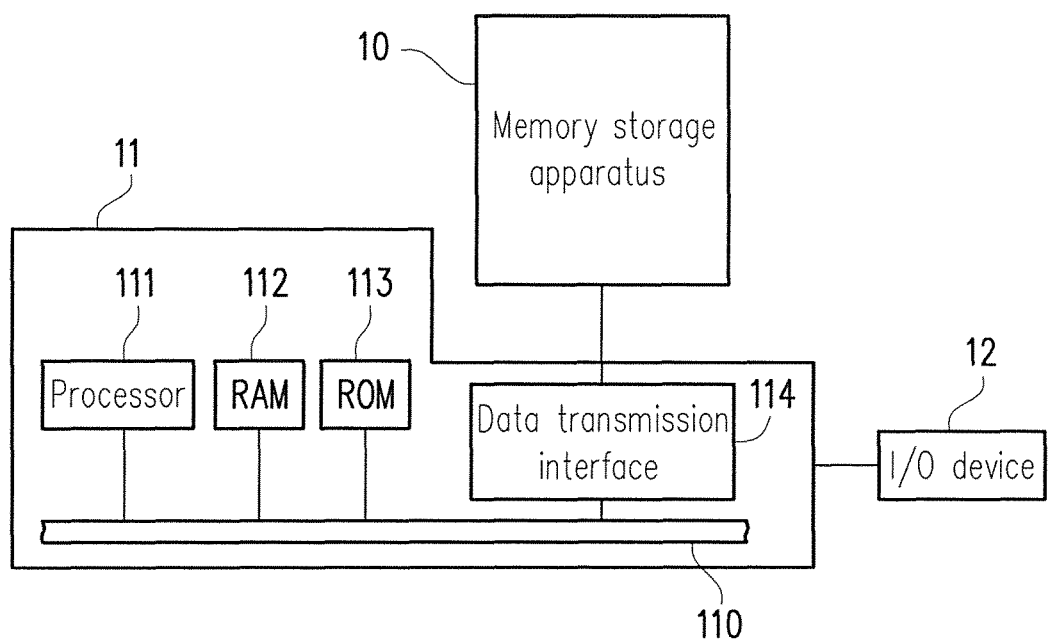
FIG. 1 is a schematic diagram illustrating a host system, a memory storage apparatus and an input/output (I/O) device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage apparatus (i.e., a memory storage system) includes a rewritable non-volatile memory module and a controller (i.e., a control circuit). The memory storage apparatus is usually used together with a host system, such that the host system can write data into or read data from the memory storage apparatus.

Figure 2:
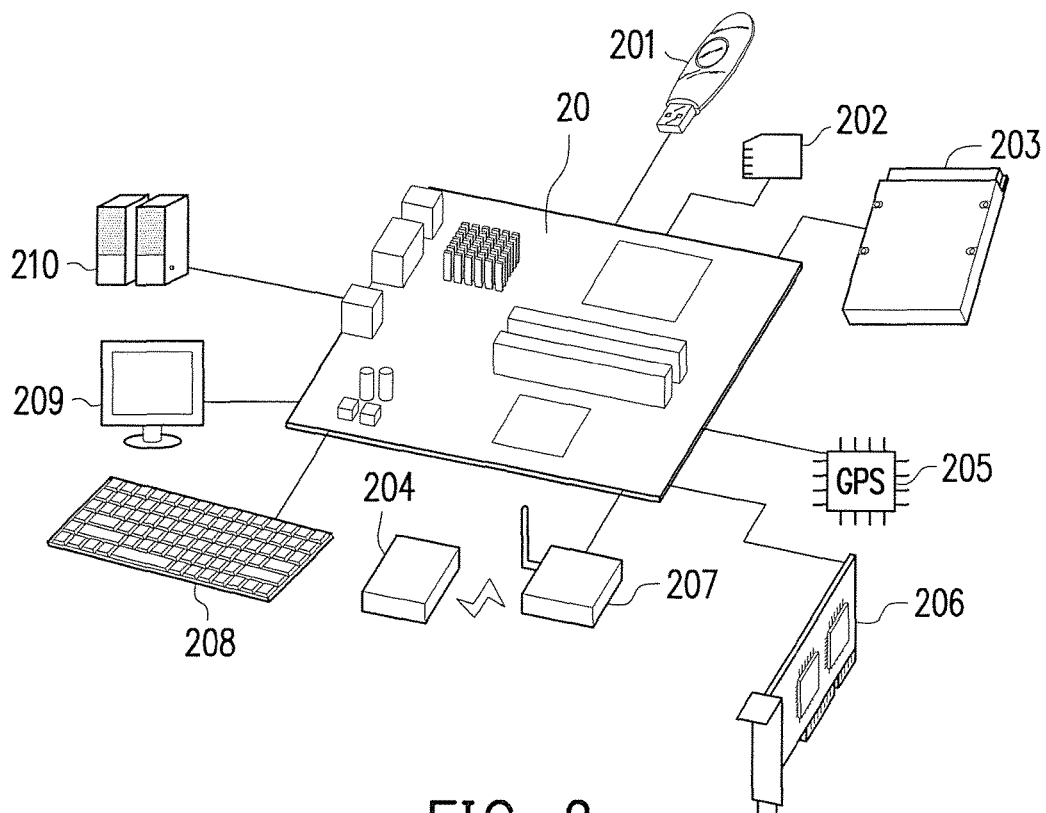
FIG. 2 is a schematic diagram illustrating a host system, a memory storage apparatus and an input/output (I/O) device according to another exemplary embodiment.

FIG. 1 is a schematic diagram illustrating a host system, a memory storage apparatus and an input/output (I/O) device according to an exemplary embodiment. FIG. 2 is a schematic diagram illustrating a host system, a memory storage apparatus and an I/O device according to another exemplary embodiment.

Referring to FIG. 1 and FIG. 2, a host system 11 generally includes a processor 111, a random access memory (RAM) 112, a read only memory (ROM) 113 and a data transmission interface 114. The processor 111, the RAM 112, the ROM 113 and the data transmission interface 114 are coupled to a system bus 110.

In the present exemplary embodiment, the host system 11 is coupled to the memory storage apparatus 10 through the data transmission interface 114. For example, the host system 11 may write data into or read data from the memory storage apparatus 10 through the data transmission interface 114. Additionally, the host system 11 is coupled to the I/O device 12 through the system bus 110. For example, the host system 11 may transmit an output signal to the I/O device 12 or receive an input signal from the I/O device 12 through the system bus 110.

In the present exemplary embodiment, the processor 111, the RAM 112, the ROM 113 and the data transmission interface 114 may be disposed on a motherboard 20 of the host system 11. The number of the data transmission interface 114 may be one or plural. The motherboard 20 may be coupled to the memory storage apparatus 10 in a wired or a wireless manner through the data transmission interface 114. The memory storage apparatus 10 may be, for example, a flash drive 201, a memory card 202, a solid state drive (SSD) 203 or a wireless memory storage apparatus 204. The wireless memory storage apparatus 204 may be a memory storage apparatus employing various wireless communication techniques, such as a near field communication (NFC) memory storage apparatus, a wireless fidelity (Wi-Fi) memory storage apparatus, a Bluetooth memory storage apparatus or a Bluetooth memory storage apparatus (e.g., an iBeacon) with low power consumption and so on. Additionally, the motherboard 20 may also be coupled to a variety of I/O devices, such as a global positioning system (GPS) module 205, a network interface card 206, a wireless transmission device 207, a keyboard 208, a display 209, a speaker

210 through the system bus 110. For example, in an exemplary embodiment, the motherboard 20 may access wireless memory storage apparatus 204 through the wireless transmission device 207.

Figure 3:
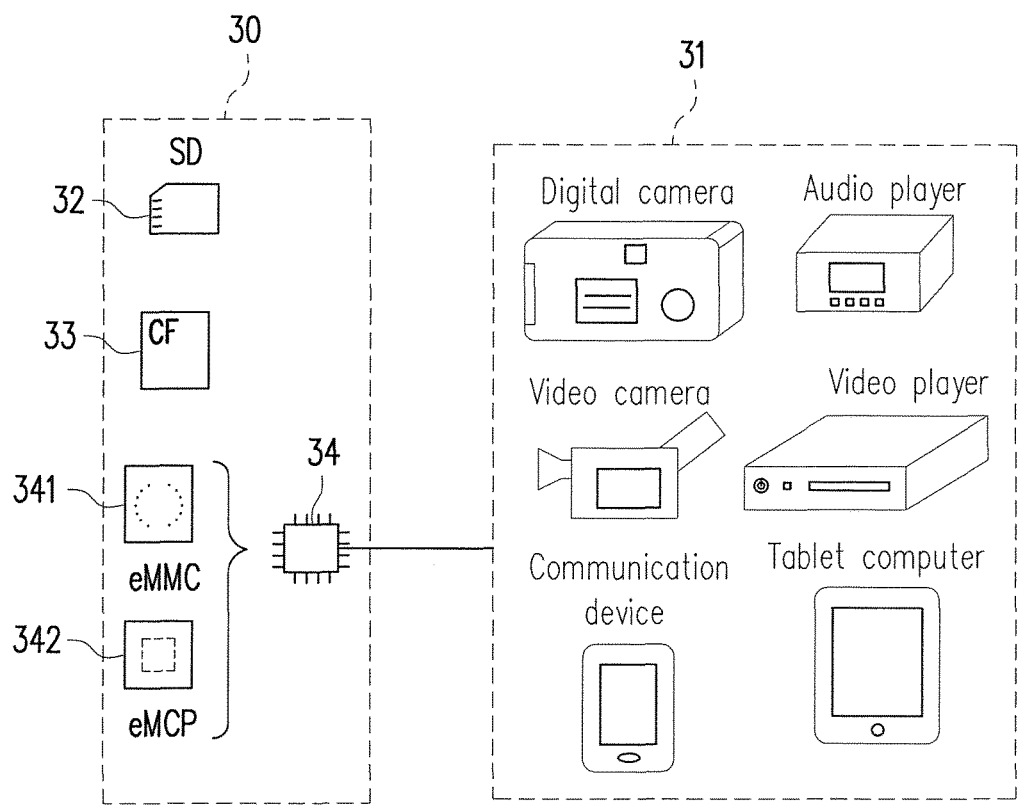
FIG. 3 is a schematic diagram illustrating a host system and a memory storage apparatus according to another exemplary embodiment.

In an exemplary embodiment, the aforementioned host system may substantially be any system used together with the memory storage apparatus for storing data. Even though the host system is described as a computer system in the exemplary embodiment, the invention is not limited thereto. FIG. 3 is a schematic diagram illustrating a host system and a memory storage apparatus according to another exemplary embodiment of the invention. Referring to FIG. 3, in another exemplary embodiment, the host system 31 may also be a system, such as a digital camera, a video camera, a communication device, an audio player, a video player, a tablet computer and so on, while the memory storage apparatus 30 may be a storage apparatus for a variety of non-volatile memories, such as an SD 32, a CF card 33, or an embedded storage device 34. The embedded storage device 34 includes an embedded storage device of any kind, where a memory module of any kind is directly coupled to a substrate of the host system, such as an embedded multimedia card (eMMC) 341 and/or an embedded multi-chip package (eMCP) storage device 342.

Figure 4:
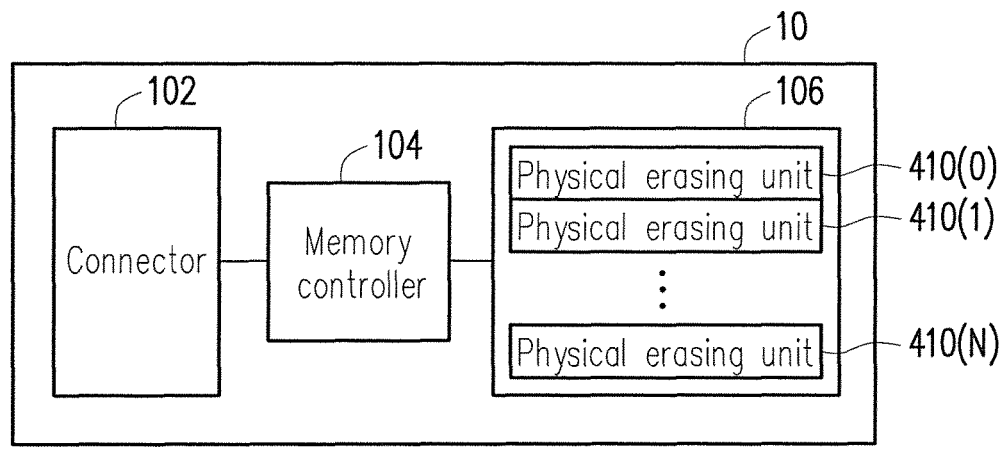
FIG. 4 is a schematic block diagram illustrating the memory storage apparatus according to an exemplary embodiment.

FIG. 4 is a schematic block diagram illustrating the memory storage apparatus according to an exemplary embodiment.

Referring to FIG. 4, the memory storage apparatus 10 includes a connector 102, a memory controller 104 and a rewriteable non-volatile memory module 106.

In the present exemplary embodiment, the connector 102 complies with the serial advanced technology attachment (SATA) standard. However, the invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the secure digital (SD) interface standard, the ultra high speed-I (UHS-I) standard, the ultra high speed-II (UHS-II) standard, the memory sick (MS) standard, the multi-chip package interface standard, the multi media card (MMC) standard, the embedded multimedia card (eMMC) interface standard, the universal flash storage (UFS) interface standard, the embedded multi chip package (eMCP) interface standard, the compact flash (CF) interface standard, the integrated device electronics (IDE) standard, or other suitable standards. The connector 102 may be packaged with the memory controller 104 in a chip, or disposed outside of a chip including the memory controller 104.

The memory controller 104 is configured for executing a plurality of logic gates or control commands which are implemented in a hardware form or in a firmware form and perform operations such as data writing, reading or erasing in the rewriteable non-volatile memory module 106 according to commands of the host system 11.

The rewriteable non-volatile memory module 106 is coupled to the memory controller 104 and configured to store data written by the host system 11. The rewriteable non-volatile memory module 106 has physical erasing units 410(0) to 410(N). For example, the physical erasing units 410(0) to 410(N) may belong to the same memory die or different memory dies. Each physical erasing unit has a plurality of physical programming units, and the physical programming units belonging to the same physical erasing unit may be written separately but erased altogether at the same time. However, it should be understood that the invention is not limited thereto, and each physical erasing unit may consist of 64, 256 or any other number of physical programming units.

To be more detailed, each of the physical erasing units is the smallest unit for erasing. Namely, each physical erasing unit contains the least number of memory cells for being erased altogether. Each of the physical programming units is the smallest unit for programming. Namely, each physical programming unit is the smallest unit for write data. Each physical programming unit commonly includes a data bit area and a redundant bit area. The data bit area includes a plurality of physical accessing addresses for storing user data, and the redundant bit area is used for storing system data (e.g., control information and error correcting code (ECC)). In the present exemplary embodiment, the data bit area of each physical programming unit includes 4 physical access addresses, and a size of one physical access address is 512 bytes. However, in other exemplary embodiments, the data bit area may also contain the physical access addresses in a greater or a smaller number, and the invention is not intent to limit the size and the number of the physical access addresses. For example, in an exemplary embodiment, the physical erasing units are physical blocks, and the physical programming units are physical pages or physical sectors, which are not limited in the invention.

In the present exemplary embodiment, the rewriteable non-volatile memory module 106 is a multi level cell (MLC) NAND flash memory module (i.e., a flash memory module in which a memory cell may store data of 2 bits). However, the present invention is not limited thereto, the rewriteable non-volatile memory module 106 may also be a single level cell (SLC) NAND flash memory module (i.e., a flash memory module in which a memory cell may store data of 1 bit), a trinary level cell (TLC) NAND flash memory module (i.e., a flash memory module in which a memory cell may store data of 3 bits), other flash memory modules or other memory modules with the same characteristics.

Figure 5:
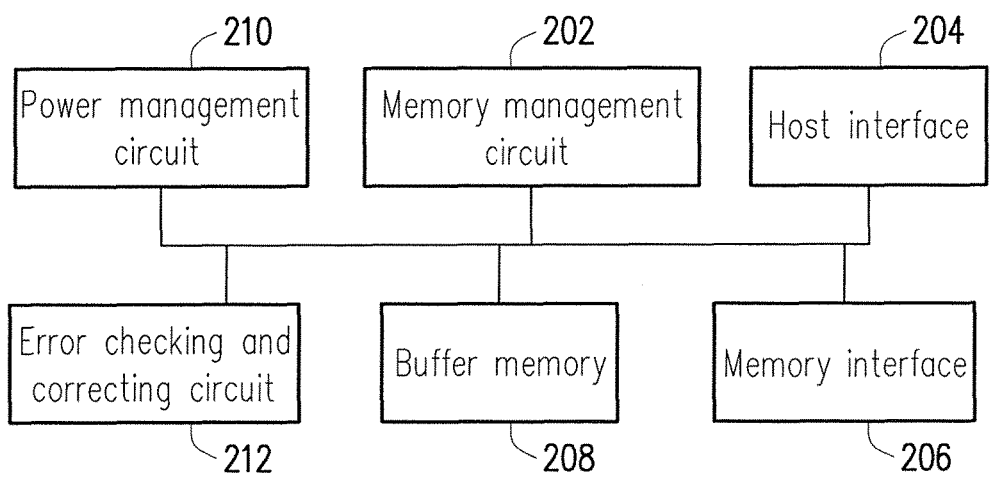
FIG. 5 is a schematic block diagram illustrating the memory controller according to an exemplary embodiment.

FIG. 5 is a schematic block diagram illustrating the memory controller according to an exemplary embodiment.

Referring to FIG. 5, the memory controller 104 includes a memory management circuit 202, a host interface 204 and a memory interface 206.

The memory management circuit 202 is configured to control the whole operation of the memory controller 104. Particularly, the memory management circuit 202 has a plurality of control instructions, and when the memory storage apparatus 100 is operated, the control instructions are executed to perform a data writing operation, a data reading operation, and a data erasing operation.

In the present exemplary embodiment, the control instructions of the memory management circuit 202 are implemented in a form of firmware. For example, the memory management circuit 202 includes a microprocessor unit (not shown) and a read-only memory (ROM, not shown), where the control instructions are burned into the ROM. When the memory storage apparatus 100 is operated, the control instructions are executed by the microprocessor unit to perform a data writing operation, a data reading operation, a data erasing operation, and so on.

In another exemplary embodiment, the control instructions of the memory managing circuit 202 may also be stored in a specific area (for example, a system area in a memory module exclusively used for storing system data) of the rewriteable non-volatile memory module 10. Additionally, the memory managing circuit 202 includes a microprocessor unit (not shown), a read-only memory (ROM, not shown) and a random access memory (not shown). In particular, the ROM has a boot code, and when the memory control circuit unit 104 is enabled, the microprocessor unit first executes the boot code to load control instructions from the rewriteable non-volatile memory module 106 into the RAM of the memory management circuit 202. Afterwards, the microprocessor unit then executes the control instructions to perform a data writing operation, a data reading operation, a data erasing operation, and so on.

Furthermore, in another exemplary embodiment, the control instructions of the memory management circuit 202 may also be implemented in a form of hardware. For example, the memory management circuit 202 may include a micro controller, a memory cell managing circuit, a memory writing circuit, a memory reading circuit, a memory erasing circuit and a data processing circuit. The memory managing circuit, the memory writing circuit, the memory reading circuit, the memory erasing circuit and the data processing circuit are coupled to the micro controller. The memory management circuit is configured to manage the physical erasing units of the rewriteable non-volatile memory module 106; the memory writing circuit is configured to issue a write command to the rewriteable non-volatile memory module 106 to write data into the rewriteable non-volatile memory module 106; the memory reading circuit is configured to issue a read command to the rewriteable non-volatile memory module 106 to read data from the rewriteable non-volatile memory module 106; the memory erasing circuit is configured to issue an erase command to the rewriteable non-volatile memory module 106 to erase data from the rewriteable non-volatile memory module 106; and the data processing circuit is configured to process data to be written into the rewriteable non-volatile memory module 106 and data to be read from the rewriteable non-volatile memory module 106.

The host interface 204 is coupled to the memory management circuit 202 and configured to receive and identify commands and data transmitted from the host system 11. Namely, the commands and data transmitted by the host system 11 are transmitted to the memory management circuit 202 through the host interface 204. In the present exemplary embodiment, the host interface 204 complies with the SATA standard. However, it should be understood that the present invention is not limited thereto, and the host interface 204 may also comply with the PATA standard, the IEEE 1394 standard, the PCI Express standard, the USB standard, the UHS-I interface standard, the UHS-II interface standard, the SD standard, the MS standard, the MMC standard, the CF standard, the IDE standard or other appropriate data transmission standards.

The memory interface 206 is coupled to the memory management circuit 202 for accessing the rewriteable non-volatile memory module 106. In other words, the data to be written into the rewriteable non-volatile memory module 106 is converted to an acceptable format for the rewriteable non-volatile memory module 106 through the memory interface 206.

In an exemplary embodiment, the memory controller 104 further includes a buffer memory 208, a power management circuit 210 and an error checking and correcting circuit 212.

The buffer memory 208 is coupled to the memory management circuit 202 and configured to temporarily store the data and commands from the host system 11 or the data from the rewriteable non-volatile memory module 106.

The power managing circuit 210 is coupled to the memory management circuit 202 and configured to control the power of the memory storage apparatus 100.

The error checking and correcting circuit 212 is coupled to the memory management circuit 202 and configured to perform an error checking and correcting procedure to assure accuracy of the data. To be specific, when the memory management circuit 202 receives a write command from the host system 11, the error checking and correcting circuit 212 generates an error checking and correcting code (ECC code) corresponding to the data of the write command, and the memory management circuit 202 writes the data corresponding to the write command and the corresponding ECC code into the rewriteable non-volatile memory module 106. Afterwards, the memory management circuit 202 reads the corresponding ECC code of the data simultaneously when reading the data from the rewriteable non-volatile memory module 106, and the error checking and correcting circuit 212 performs the error checking and correcting procedure according to the ECC code.

Figure 6:
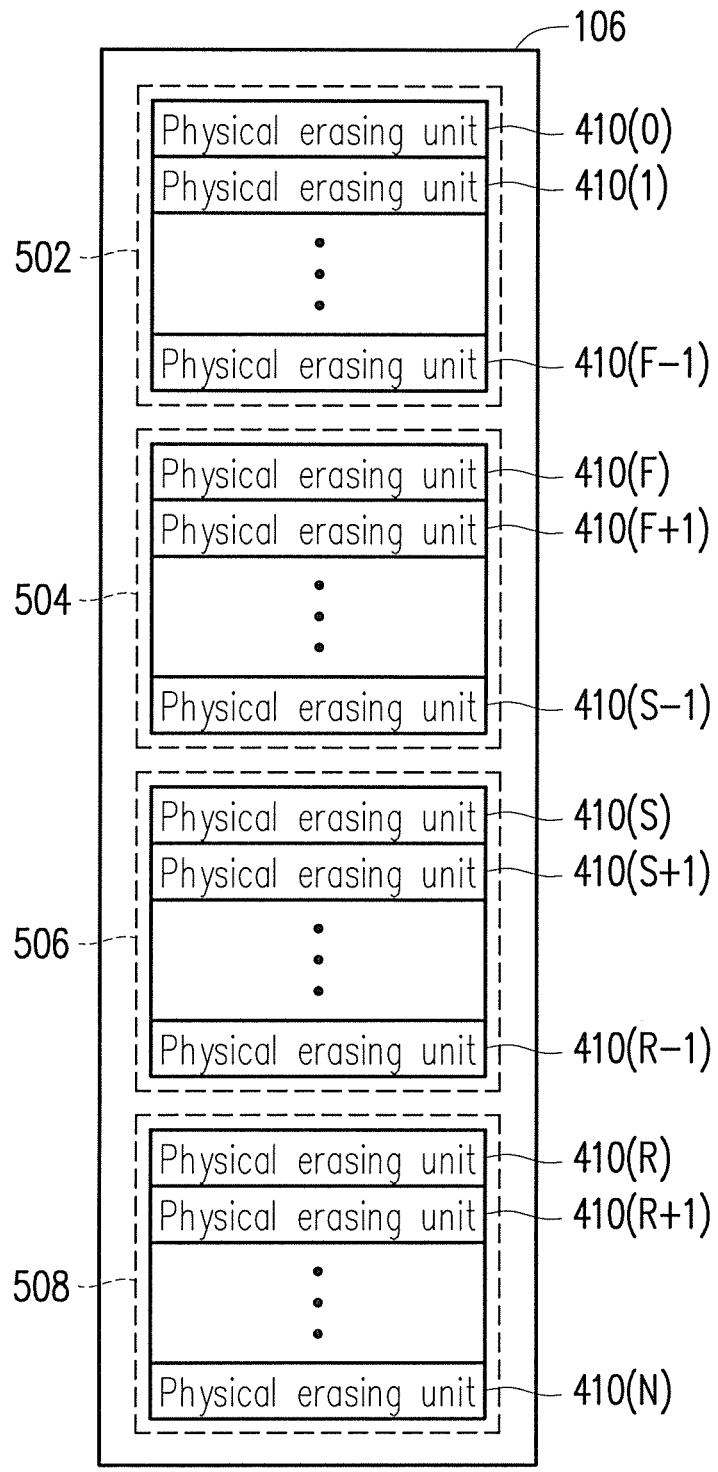
FIG. 6 and FIG. 7 are schematic diagrams illustrating examples of the management of the physical erasing units according to an exemplary embodiment.
Figure 7:
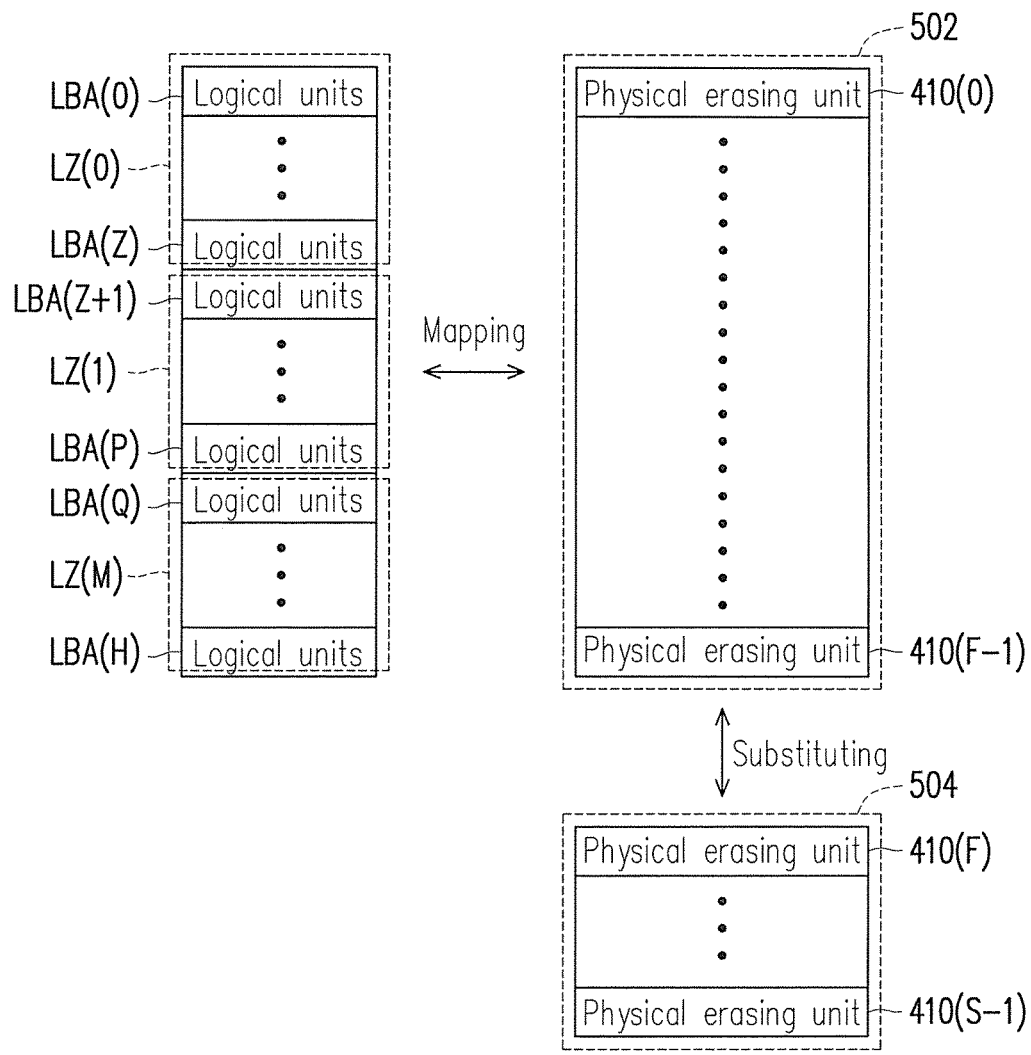

FIG. 6 and FIG. 7 are schematic diagrams illustrating examples of the management of the physical erasing units according to an exemplary embodiment.

Referring to FIG. 6, the memory controller 104 (or the memory management circuit 202) logically groups the physical erasing units 410(0) to 410(N) into a data area 502, a spare area 504, a system area 506 and a replacement area 508.

The physical erasing units logically belonging to the data area 502 and the spare area 504 are configured to store data from the host system 11. To be specific, the physical erasing units of the data area 502 are considered as the physical erasing units stored with data, and the physical erasing units of the spare area 504 are used for substituting the physical erasing units of the data area 502. Namely, when a write command and data to be written are received from the host system 11, the memory management circuit 202 selects a physical erasing unit from the spare area 504 and writes the data into the selected physical erasing unit to substitute for the physical erasing unit of the data area 502.

The physical erasing units logically belonging to the system area 506 are configured to record system data. For example, the system data includes the manufacturers and models of the rewritable non-volatile memory module, the number of physical erasing units in the rewritable non-volatile memory modules, the number of physical programming units in each physical erasing unit, and so on.

The physical erasing units logically belonging to the replacement area 508 are configured for a bad physical erasing unit replacement procedure to replace damaged physical erasing units. To be specific, if there are still normal physical erasing units in the replacement area 508, and a physical erasing unit in the data area 502 is damaged, the memory management circuit 202 selects a normal physical erasing unit from the replacement area 508 to replace the damaged physical erasing unit.

Specially, the numbers of the physical erasing units in the data area 502, the spare area 504, the system area 506 and the replacement area 508 vary based on different memory module standards. Additionally, it should be understood that the relationships of grouping the physical erasing units to the data area 502, the spare area 504, the system area 506 and the replacement area 508 are dynamically changed during the operation of the memory storage apparatus 100. For example, when a physical erasing unit of the spare area 504 is damaged and replaced by a physical erasing unit of the replacement area 508, the physical erasing unit of the replacement area 508 is associated to the spare area 504.

Referring to FIG. 7, the memory controller 104 (or the memory management circuit 202) may configure a plurality of logical units LBA(0) to LBA(H) to map the physical erasing units of the data area 502, where each logical unit includes a plurality of logical pages for mapping the physical programming units of the corresponding physical erasing units. Also, when the host system 100 is to write data into a logical unit or update the data stored in a logical unit, the memory controller 104 (or the memory management circuit 202) selects a physical erasing unit from the spare area 504 as an active physical erasing unit to write the data and substitute for a physical erasing unit of the data area 502.

In the present exemplary embodiment, a trim table is configured in the buffer memory 208. In this case, the trim table may be configured to record corresponding information between special type data in the data area and the logical pages (or the logical addresses) of each of the logical units LBA(0) to LBA(H). To be specific, the physical programming units of each of the physical erasing units 410(0) to 410(F−1) in the data area 502 may be configured to store write data written by the host system. The write data may be general type data or special type data, in which the special type data may be a string whose each bit is equal to 0. At an appropriate time, e.g., when the host system 11 is in an idle time, or when the trim table is fully written, the memory controller 104 (or the memory management circuit 202) stores the content recorded by the trim table in the system area 506 of the rewriteable non-volatile memory module 106 to clear the space of the trim table in the buffer memory 208.

Additionally, in order to solve the problem of frequently storing the trim table during the valid data merging operation, the memory controller 104 (or the memory management circuit 202) further groups the physical erasing units 410(0) to 410(F−1) of the data area 502 into at least a first group and a second group in the present exemplary embodiment, so as to select the physical erasing units for the valid data merging operation from the data area 502 more efficiently and reduce the times for storing the trim table in the rewriteable non-volatile memory module 106. To be specific, the physical erasing units of the data area 502 which are grouped into the first group indicate that a trim table recording the special type data of the physical erasing units of the first group is not stored in the rewriteable non-volatile memory module 106, while on the contrary, the physical erasing units of the data area 502 which are grouped into the second group indicate that a trim table recording the special type data of the physical erasing units of the second group is already stored in the rewriteable non-volatile memory module 106, and the memory controller 104 (or the memory management circuit 202) selects the physical erasing units for the valid data merging operation from the second group, such that the times of storing the trim table during the valid data merging operation may be reduced.

FIG. 8A to FIG. 9B illustrate simplified examples of writing data and updating the trim tables.

Figure 8A:
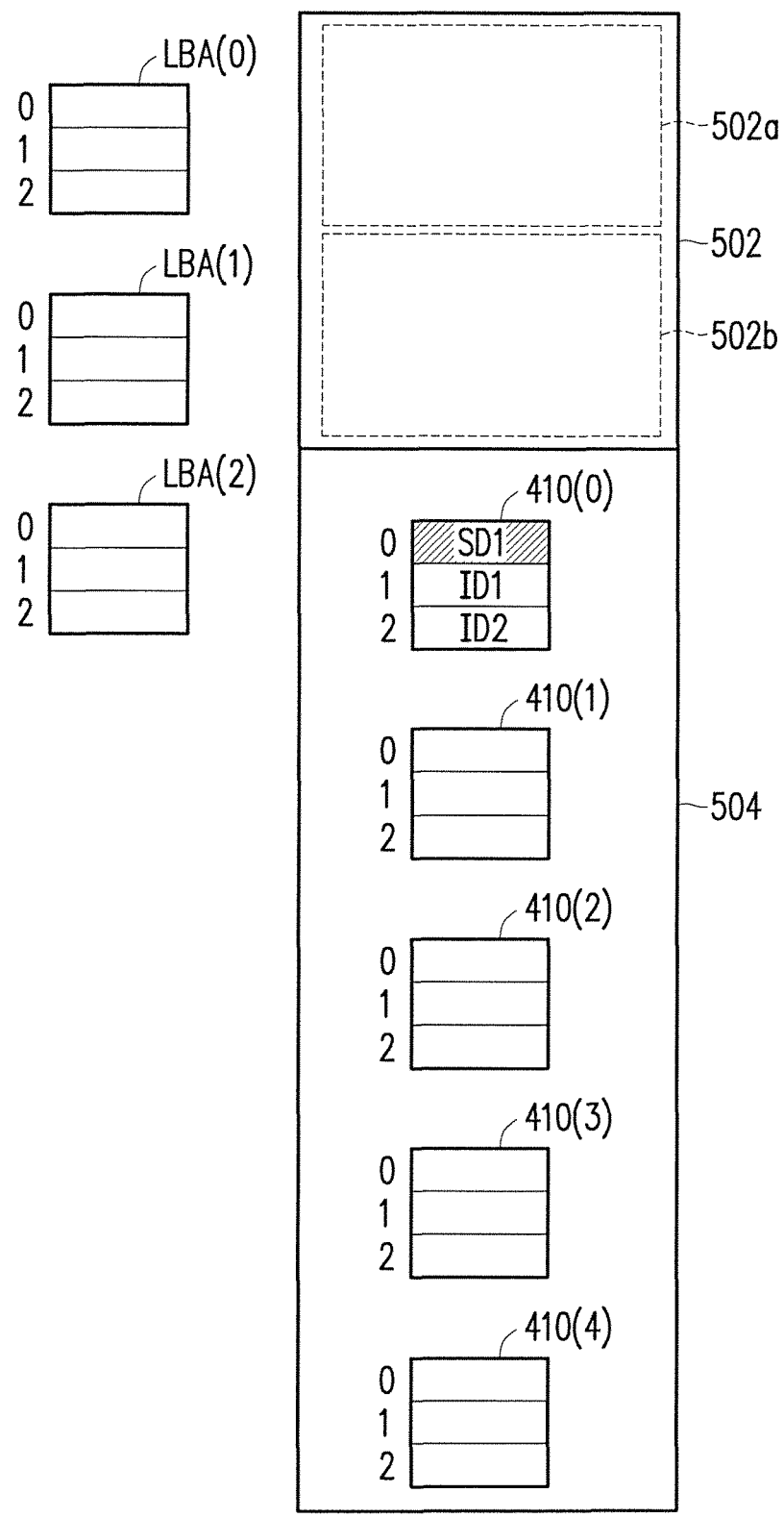
FIG. 8A to FIG. 9B illustrate simplified examples of writing data and updating the trim table.

FIG. 8A to FIG. 9B illustrate simplified examples of writing data and updating the trim table. In the present exemplary embodiment, the data area 502 includes a first group 502a and a second group 502b. For descriptive convenience, it is assumed that in a state of the memory storage apparatus 100 as illustrated in FIG. 8A, the data area 502 does not store the write data from the host system 11, the logical pages of the logical units LBA(0) to LBA(2) are not mapped to any physical erasing units, and the spare area 504 includes 5 physical erasing units, which are physical erasing units 410(0) to 410(4), respectively. Therein, each physical erasing unit includes 3 physical programming units, and when determining that the number of physical erasing units in the spare area 504 is not greater than a predefined value, the memory controller 104 (or the memory management circuit 202) performs the valid data merging operation to release more storage spaces. In the present exemplary embodiment, the predefined value is 2. Namely, in a scenario that only two physical erasing units remain in the spare area 504, the memory controller 104 (or the memory management circuit 202) performs the valid data merging operation.

In the state of the memory storage apparatus 100 as illustrated in FIG. 8A, if it is assumed that the host system 11 is to write special type data SD1 to a $0^{th}$ logical page of the logical unit LBA(0), the memory controller 104 (or the memory management circuit 202) selects, for example, the physical erasing unit 410(0) from the spare area 504 as the active physical erasing unit, and issues a write command to write the special type data SD1 into a $0^{th}$ physical programming unit of the physical erasing unit 410(0). The memory controller 104 (or the memory management circuit 202) records mapping information of the $0^{th}$ physical programming unit of the physical erasing unit 410(0) and the $0^{th}$ logical page of the logical unit LBA(0) in a physical address-logical address mapping table Then, the memory controller 104 (or the memory management circuit 202) records corresponding information between the special type data SD1 and the $0^{th}$ logical page of the logical unit LBA(0) in a trim table 600 of the buffer memory 208. To be specific, referring to FIG. 8B, if it is assumed that the special type data SD1 is a string whose each bit is equal to 0 (which is also referred to first type data), the memory controller 104 (or the memory management circuit 202) records a type of the special type data SD1 as the first type (i.e., information "1") and the corresponding information of the $0^{th}$ logical page (i.e., information "LBA(0)–0") of the logical unit LBA(0) mapped by the special type data SD1 in the trim table 600.

Then, if it is assumed that thereafter, the host system 11 respectively writes general type data ID1 and general type data ID2 into a $1^{st}$ and a $2^{nd}$ logical pages of the logical unit LBA(0), the memory controller 104 (or the memory management circuit 202) issue a write command to continue to write the general type data ID1 and the general type data ID2 to a $1^{st}$ and a $2^{nd}$ physical programming units of the physical erasing unit 410(0). Then, the memory controller 104 (or the memory management circuit 202) the mapping information of the $1^{st}$ physical programming unit of the physical erasing unit 410(0) mapped to the $1^{st}$ logical page of the logical unit LBA(0) and the mapping information of the $2^{nd}$ physical programming unit of the physical erasing unit 410(0) mapped to the $2^{nd}$ logical page of the logical unit LBA(0) in the physical address-logical address mapping table.

Figure 8B:
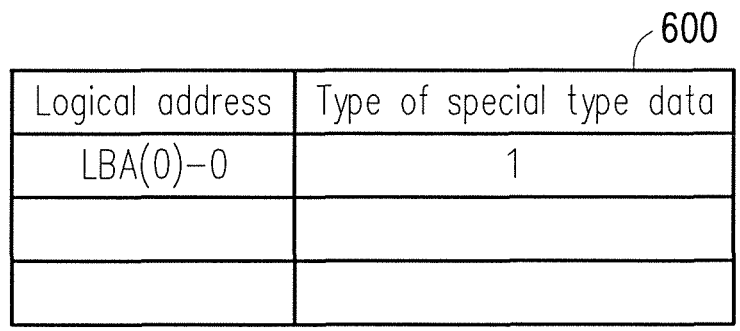
Figure 9A:
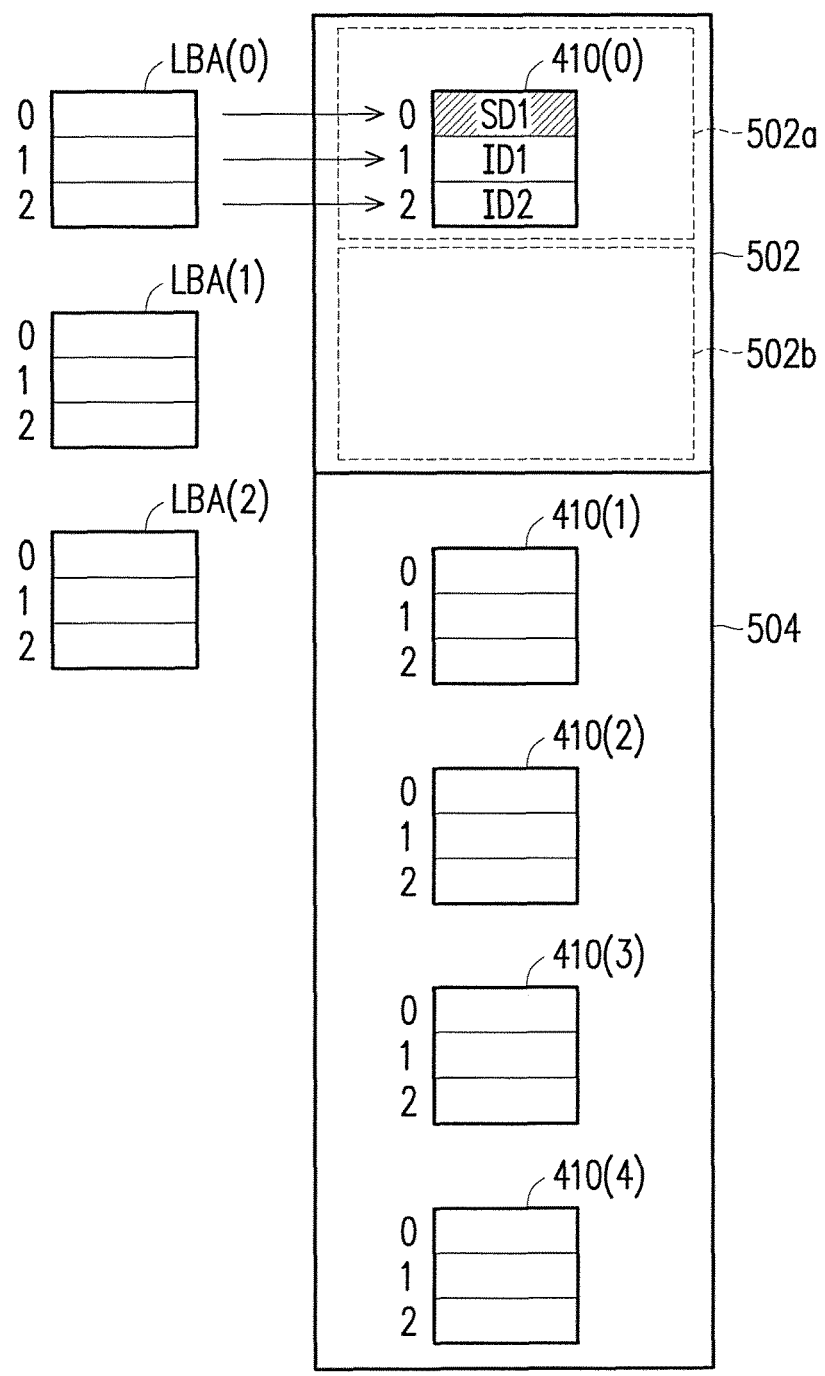

Referring to FIG. 9A and FIG. 9B together, following FIG. 8A and FIG. 8B, it is assumed here that the idle time of the host system 11 is over a predetermined value, the memory controller 104 (or the memory management circuit 202) loads a logical address-physical address mapping table with respect to the logical unit LBA(0) from the rewriteable non-volatile memory module 106 into the buffer memory 208 according to the physical address-logical address mapping table. Then, the memory controller 104 (or the memory management circuit 202) updates the mapping relationship between the logical unit LBA(0) and the physical erasing unit 410(0). The memory controller 104 (or the memory management circuit 202) maps the 0th logical page of the logical unit LBA(0) to the $0^{th}$ physical programming unit of the physical erasing unit 410(0), maps the $1^{st}$ logical page of the logical unit LBA(0) to the $1^{st}$ physical programming unit of the physical erasing unit 410(0) and maps the $2^{nd}$ logical page of the logical unit LBA(0) to the $2^{nd}$ physical programming unit of the physical erasing unit 410(0) according to the physical address-logical address mapping table. Thereafter, the memory controller 104 (or the memory management circuit 202) associates and groups the physical erasing unit 410(0) to the first group 502a in the data area 502, as illustrated in FIG. 9A. It should be noted that at this time, the memory controller 104 (or the memory management circuit 202) does not perform the valid data merging operation on the physical erasing units of the rewriteable non-volatile memory module 106 yet, and the trim table 600 stored in the buffer memory 208 is not yet stored in the rewriteable non-volatile memory module 106, as illustrated in FIG. 9B.

FIG. 10A to FIG. 13B illustrate simplified examples of the valid data merging operation and trim table storing.

Figure 10A:
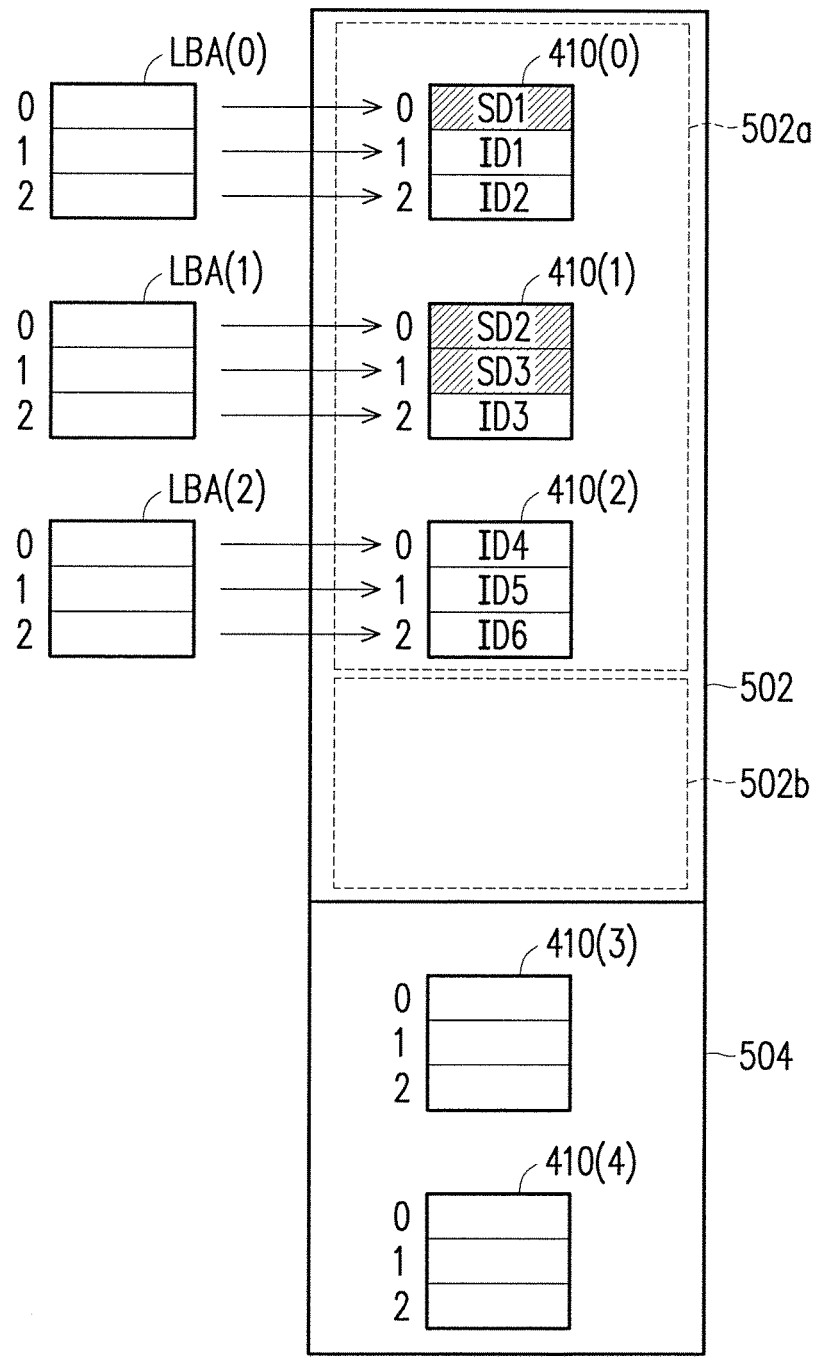

Referring to FIG. 10A and FIG. 10B together, following FIG. 9A and FIG. 9B, it is assumed that the host system 11 respectively writes special type data SD2, special type data SD3 and general type data ID3 into the $0^{th}$ to the $2^{nd}$ physical programming units of the physical erasing unit 410(1) in the aforementioned writing manner, and the memory controller 104 (or the memory management circuit 202) loads the corresponding logical address-physical address mapping table to respectively map the $0^{th}$ to the $2^{nd}$ logical pages of the logical unit LBA(1) to the $0^{th}$ to the $2^{nd}$ physical programming units of the physical erasing unit 410(1), associates and groups the physical erasing unit 410(1) to the first group 502a in the data area 502. Additionally, the memory controller 104 (or the memory management circuit 202) stores corresponding information between the special type data SD2 and the $0^{th}$ logical page of the logical unit LBA(1) in the trim table 600 of the buffer memory 208 and stores corresponding information between the special type data SD3 and the $1^{st}$ logical page of the logical unit LBA(1) in the trim table 600 of the buffer memory 208. To be specific, referring to FIG. 10B, if it is assumed that the special type data SD2 is a string with "01" being repeatedly arranged (which is also referred to as a second type data), the memory controller 104 (or the memory management circuit 202) records a type of the special type data SD2 as the second type (i.e., information "2") and the corresponding information of the $0^{th}$ logical page (i.e., information "LBA(1)–0") of the logical unit LBA(1) mapped by the special type data SD2 in the trim table 600. Similarly, if it is assumed that the special type data SD3 is a string whose each bit is equal to 0 (which is also referred to the first type data), the memory controller 104 (or the memory management circuit 202) records the type of the special type data SD3 as the first type data (i.e., information "1") and the corresponding information of the $1^{st}$ logical page (i.e., information "LBA(1)–1") of the logical unit LBA(1) mapped by the special type data SD3 in the trim table 600.

Afterwards, it is assumed that the host system 11 respectively writes general type data ID4, general type data ID5 and general type data ID6 into the $0^{th}$ to the $2^{nd}$ physical programming units of the physical erasing units 410(2) in the aforementioned writing manner, and the memory controller 104 (or the memory management circuit 202) correspondingly loads the logical address-physical address mapping table to respectively map the $0^{th}$ to the $2^{nd}$ logical pages of the logical units LBA(2) to the $0^{th}$ to the $2^{nd}$ physical programming units of the physical erasing units 410(2), associates and groups the physical erasing units 410(2) to the first group 502a in the data area 502.

It should be noted that at this time, as determining that the number of the empty physical erasing units in the spare area 504 is not greater than the predefined value, the memory controller 104 (or the memory management circuit 202) performs the valid data merging operation to release more storage spaces. In the present exemplary embodiment, the predefined value is 2. Namely, in the state of the memory storage apparatus 100 as illustrate in FIG. 10A, only two empty physical erasing units, i.e., the physical erasing units 410(3) and 410(4), remain in the spare area 504, the memory controller 104 (or the memory management circuit 202) performs the valid data merging operation.

The memory controller 104 (or the memory management circuit 202) in the state of performing the valid data merging operation first determines whether the number of the physical erasing units of the second group 502b in the data area 502 is equal to 0. In other words, the memory controller 104 (or the memory management circuit 202) first determines whether the second group 502b of the data area 502 is empty.

Figure 11A:
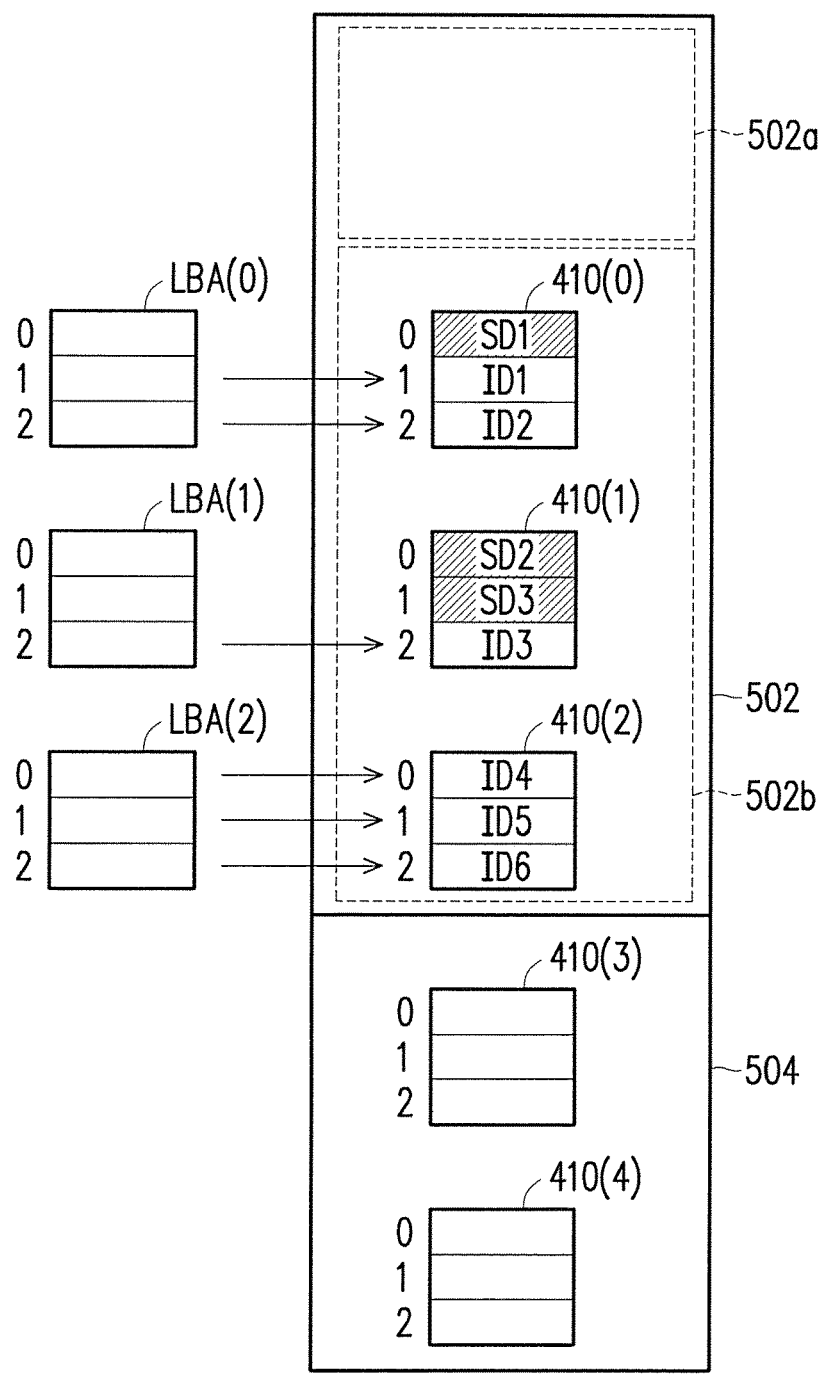

Referring to FIG. 11A and FIG. 11B together, following FIG. 10A and FIG. 10B, if determining that the number of the physical erasing units in the second group 502b is equal to 0 in FIG. 10A and FIG. 10B, the memory controller 104 (or the memory management circuit 202) stores the trim table 600 recording the special type data SD1 to SD3 in the physical erasing units 410(0) to 410(2) of the first group 502a from the buffer memory 208 to the rewriteable non-volatile memory module 106 and clears the information in the trim table 600 (as illustrated in FIG. 11B). Thereafter, the memory controller 104 (or the memory management circuit 202) groups the physical erasing units 410(0) to 410(2) of the first group 502a to the second group 502b (as illustrated in FIG. 11A).

Then, the memory controller 104 (or the memory management circuit 202) selects one of the physical erasing units (i.e., a first physical erasing unit) for valid data merging from the second group 502b of the data area 502.

Figure 12A:
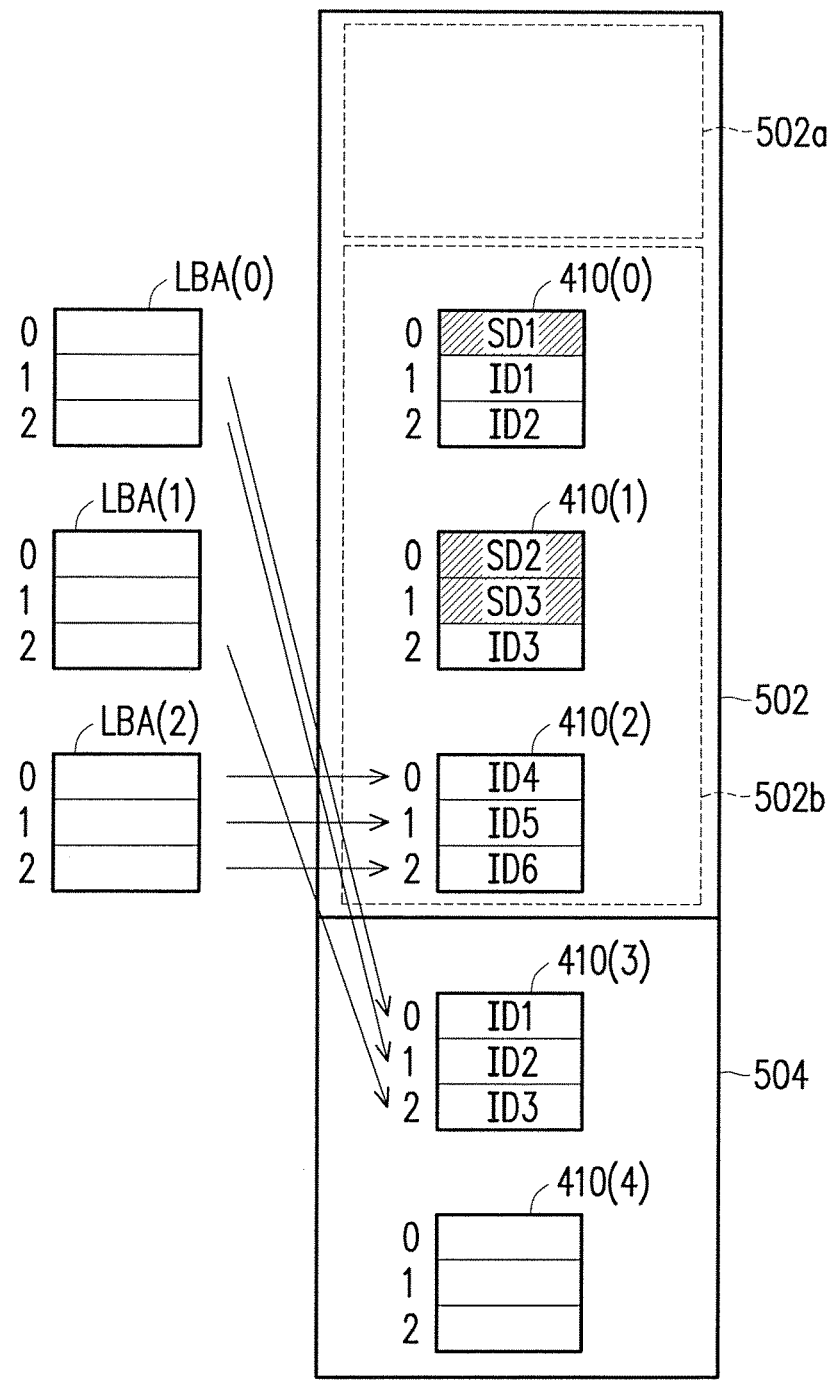
Figure 12B:
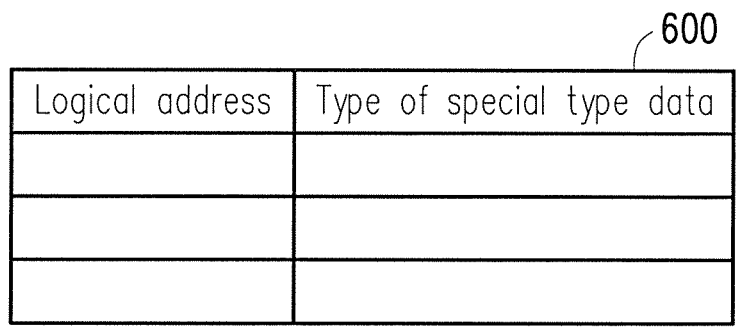

Referring to FIG. 12A and FIG. 12B together, following FIG. 11A and FIG. 11B, in the present exemplary embodiment, it is assumed that the memory controller 104 (or the memory management circuit 202) selects the physical erasing units 410(0) and 410(1) for performing the valid data merging operation. It should be understood that the present invention is not intent to limit the method of selecting the physical erasing units for performing the valid data merging operation. For example, in an exemplary embodiment, the memory controller 104 (or the memory management circuit 202) may record the number of invalid data in each physical erasing unit of the second group 502b and determine whether the number of invalid data in one of the physical erasing units of the second group 502b is greater than a predetermined value, where the predetermined value is, for example, ⅓ the number of the physical programming units of each physical erasing unit. In an exemplary embodiment, if the number of invalid data in one of the physical erasing units of the second group 502b is greater than the predetermined value, the memory controller 104 (or the memory management circuit 202) selects one physical erasing unit whose number of invalid data is greater than the predetermined value from the second group 502b as the physical erasing unit for performing the valid data merging operation.

However, in another exemplary embodiment, if the number of invalid data in each physical erasing unit of the second group 502b is not greater than the predetermined value, the memory controller 104 (or the memory management circuit 202) stores again the trim table 600 recording the special type data of the physical erasing units of the first group 502a from the buffer memory 208 to the rewriteable non-volatile memory module 106 and clear the information in the trim table 600. Thereafter, the memory controller 104 (or the memory management circuit 202) groups the physical erasing units from the first group 502a to the second group 502b. Then, the memory controller 104 (or the memory management circuit 202) again selects physical erasing units for performing the valid data merging operation from the second group 502b.

In the present exemplary embodiment, the memory controller 104 (or the memory management circuit 202) selects the physical erasing units 410(0) and unit 410(1) for performing the valid data merging operation, and since the information with respect to the special type data of the physical erasing units 410(0) and 410(1) of the trim table 600 is stored in the rewriteable non-volatile memory module 106, thus, the $0^{th}$ physical programming unit of the physical erasing unit 410(0) originally used for storing the special type data SD1, the $0^{th}$ physical programming unit of the physical erasing unit 410(1) originally used for storing the special type data SD2 and the $1^{st}$ physical programming unit of the physical erasing unit 410(0) originally used for storing the special type data SD3 are all identified as invalid data by the memory controller 104 (or the memory management circuit 202). That is, during the valid data merging operation, the special type data SD1 to the special type data SD3 are not considered as valid data, and thus, the special type data SD1 to the special type data SD3 are not copied. Thus, the memory controller 104 (or the memory management circuit 202) respectively copies the valid data (i.e., the general type data ID1 and the general type data ID2) of the current physical erasing unit 410(0) to a $0^{th}$ to a $1^{st}$ physical programming units of the physical erasing unit 410(3) (i.e., a second physical erasing unit) in the spare area 504, for example, and copies the valid data (i.e., the general type data ID3) of the physical erasing unit 410(1) to a $2^{nd}$ physical programming unit of the physical erasing unit 410 (3) in the spare area 504. Then, the memory controller 104 (or the memory management circuit 202) correspondingly remaps the $1^{st}$ logical page of the logical unit LBA(0) to the $0^{th}$ physical programming unit of the physical erasing unit 410(3), remaps the $2^{nd}$ logical page of the logical unit LBA(0) to the $1^{st}$ physical programming unit of the physical erasing unit 410(3) and remaps the $2^{nd}$ logical page of the logical unit LBA(1) to the $2^{nd}$ physical programming unit of the physical erasing unit 410(3). In this case, the memory controller 104 (or the memory management circuit 202) the data originally stored in the physical erasing units 410(0) and 410(1) are all considered as invalid data.

Figure 13A:
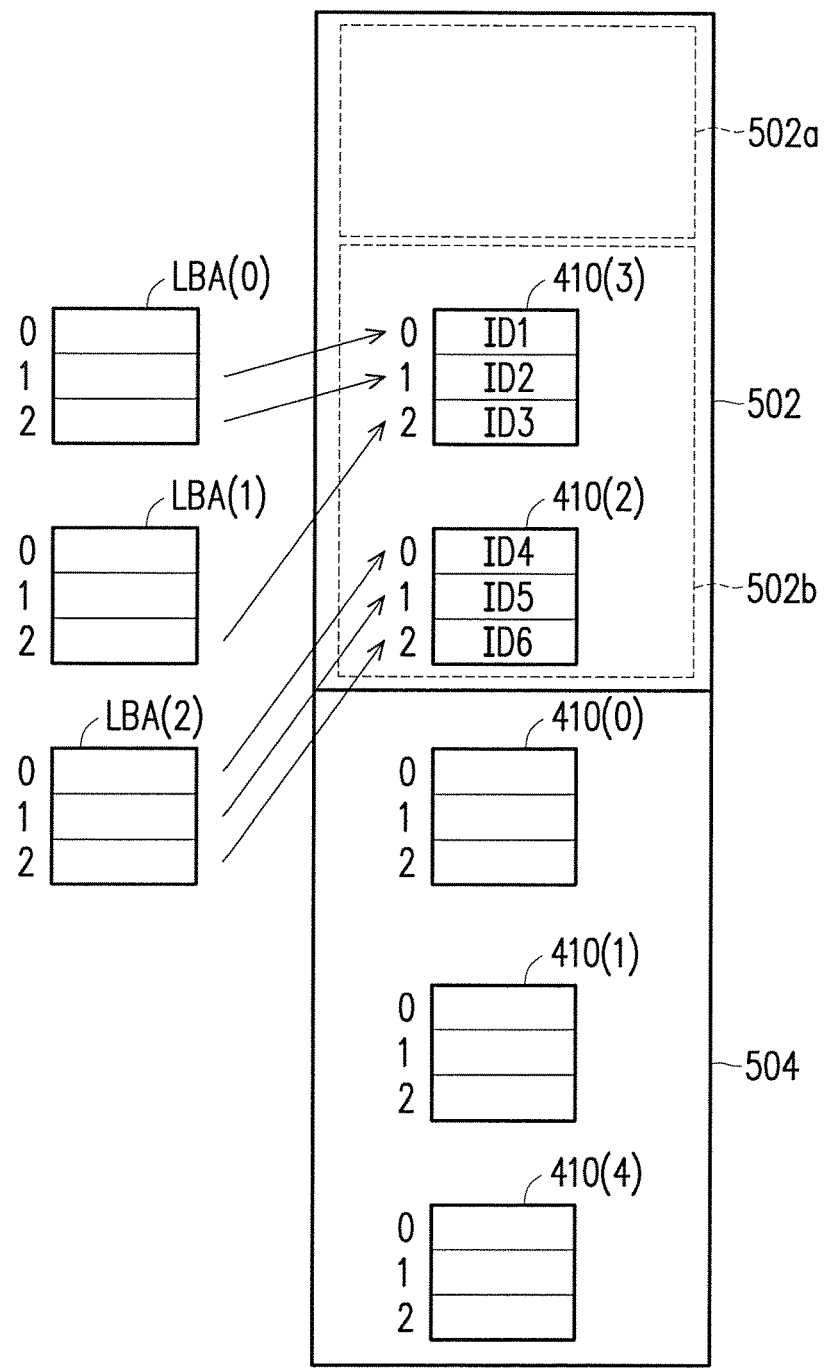

Referring to FIG. 13A and FIG. 13B together, following FIG. 12A and FIG. 12B, the memory controller 104 (or the memory management circuit 202) considers all the data originally stored in the physical erasing units 410(0) and 410(1) as invalid data, thus, the memory controller 104 (or the memory management circuit 202) performs an erasing operation on the physical erasing units 410(0) and 410(1), and re-associates the physical erasing units 410(0) and 410(1) to the spare area 504. Additionally, since the physical erasing unit 410(3) stores the valid data after the valid data merging operation is performed, and the physical erasing unit 410(3) does not contain the special type data, the physical erasing unit 410(3) is grouped into the second group 502b of the data area 502.

Through the aforementioned valid data merging operation, the number of the physical erasing units in the spare area 504 may be increased, and the times of storing the trim table 600 may be effectively reduced. To be specific, when the memory controller 104 (or the memory management circuit 202) performs the writing operation to write one write data into one of the physical erasing units (which is also referred to as a third physical erasing unit) of the rewriteable non-volatile memory module 106, for the third physical erasing unit in which the write data is written, the third physical erasing unit is grouped into the first group 502a in the data area 502 since corresponding information between special type data with respect to the write data in the third physical erasing unit and the logical pages (or the logical addresses) is only stored in the trim table 600 in the buffer memory 208, instead of in the rewriteable non-volatile memory module 106. As for the data stored in the second group 502b, the corresponding information between the special type data and the logical pages (or the logical addresses) is stored in the rewriteable non-volatile memory module 106, thus, the memory controller 104 (or the memory management circuit 202) only selects the physical erasing units for performing the valid data merging operation from the second group 502 while performing the valid data merging operation, so as to reduce the times of storing the trim table 600.

Figure 14:
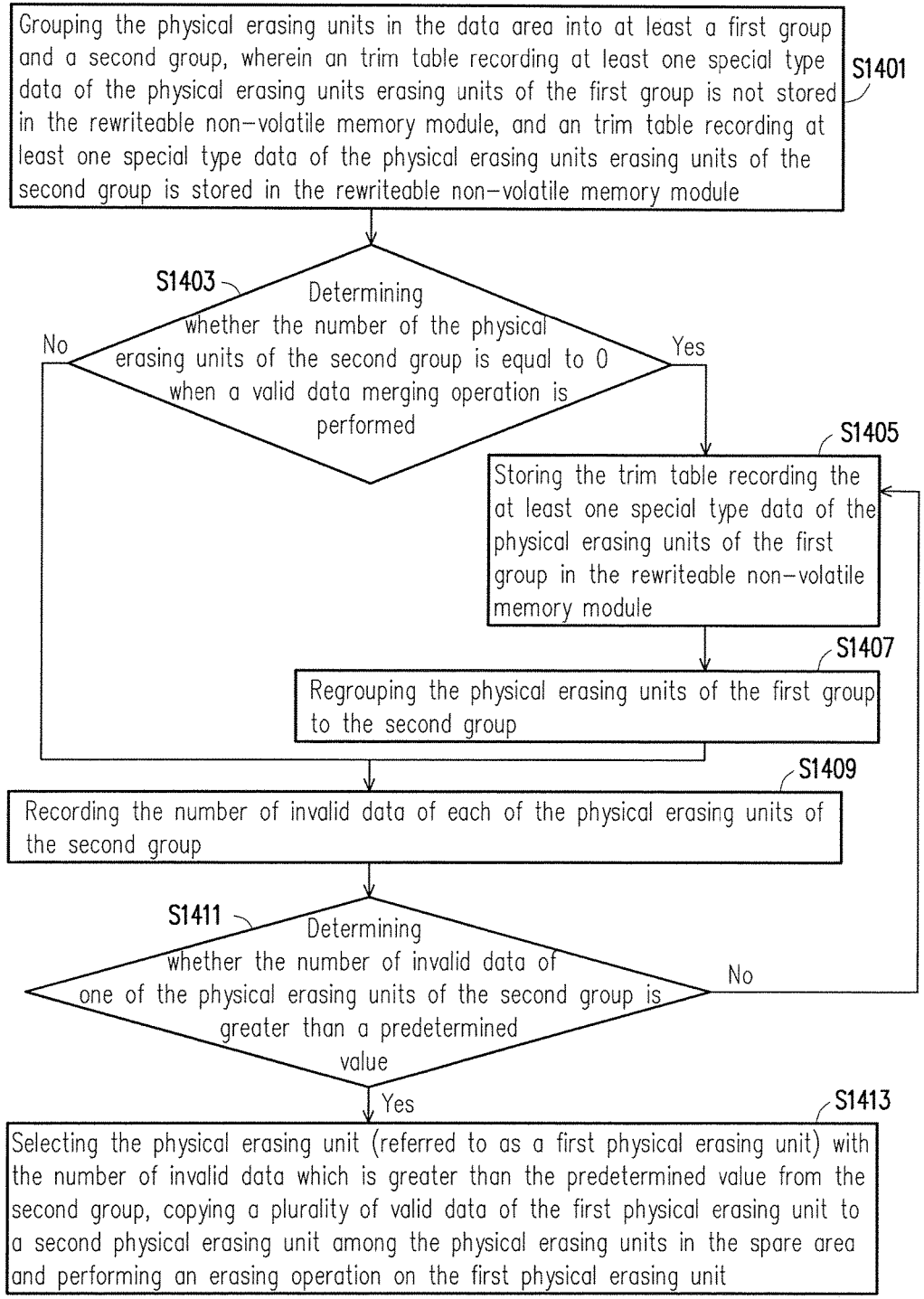
FIG. 14 is a flowchart illustrating a valid data merging method according to an exemplary embodiment.

FIG. 14 is a flowchart illustrating a valid data merging method according to an exemplary embodiment.

Referring to FIG. 14, first, physical erasing units in the data area are grouped into at least a first group and a second group. Therein, a trim table recording special type data of the physical erasing units of the first group is not stored in the rewriteable non-volatile memory module, and a trim table recording special type data of the physical erasing units of the second group is stored in the rewriteable non-volatile memory module (step S1401). When a valid data merging operation is performed, whether the number of the physical erasing units of the second group is equal to 0 is determined (step S1403). If the number of the physical erasing units of the second group is equal to 0, the trim table recording the special type data of the physical erasing units of the first group is stored in the rewriteable non-volatile memory module (step S1405), the physical erasing units of the first group is regrouped into the second group (step S1407), and step S1409 is performed.

Additionally, if the number of the physical erasing units of the second group is not equal to 0, step S1409 is directly performed.

Then, the number of invalid data of each physical erasing unit in the second group is recorded (step S1409), and whether the number of invalid data of one of the physical erasing units in the second group is greater than a predetermined value is determined (step S1411). If the number of invalid data of each physical erasing unit in the second group is not greater than the predetermined value, step S1405 is returned and performed. If the number of invalid data of one of the physical erasing units in the second group is greater than the predetermined value, the physical erasing unit (referred to as a first physical erasing unit hereinafter) with the number of invalid data which is greater than the predetermined value is selected from the second group, a plurality of valid data of the first physical erasing unit is copied to a second physical erasing unit among the physical erasing units in the spare area, and an erasing operation is performed on the first physical erasing unit (step S1413). The valid data does not include the special type data in the first physical erasing unit.

To summarize, in the present invention, the physical erasing units in the data area are grouped into the first group and the second group, where the trim table recording the special type data of the physical erasing units of the first group is not stored in the rewriteable non-volatile memory module, while the trim table recording the special type data of the physical erasing units of the second group is stored in the rewriteable non-volatile memory module. Additionally, when performing the valid data merging operation, the memory controller (or the memory management circuit) selects the physical erasing units for performing the valid data merging operation only from the second group, so as to reduce the times of storing the trim table during the valid data merging operation to solve the problem of the trim table being frequently stored in the valid data merging operation. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A valid data merging method for a flash memory module, wherein the flash memory module has a plurality of physical erasing units, each of the physical erasing units has a plurality of physical programming units, and the physical erasing units are grouped into at least a data area and a spare area, the valid data merging method comprising:
   grouping the physical erasing units in the data area into at least a first group and a second group, wherein a trim table recording at least one special type data of the physical erasing units of the first group is not stored in the flash memory module, and a trim table recording at least one special type data of the physical erasing units of the second group is stored in the flash memory module;
   performing a valid data merging operation to select a first physical erasing unit from the second group, copy a plurality of valid data of the first physical erasing unit to a second physical erasing unit among the physical erasing units in the spare area and re-associate the first physical erasing unit to the spare area; and
   performing an erasing operation on the first physical erasing unit.

2. The method according to claim 1, wherein the step of selecting the first physical erasing unit from the second group comprises:
   determining whether a number of the physical erasing units of the second group is equal to 0;
   if the number of the physical erasing units of the second group is equal to 0, storing the trim table recording the at least one special type data of the physical erasing units of the first group in the flash memory module, and regrouping the physical erasing units of the first group to the second group; and
   if the number of the physical erasing units of the second group is not equal to 0, selecting a physical erasing unit from the second group as the first physical erasing unit.

3. The method according to claim 1, wherein the step of selecting the first physical erasing unit from the second group comprises:
   recording a number of invalid data of each of the physical erasing units of the second group;
   if the number of invalid data of each of the physical erasing units of the second group is not greater than a predetermined value, storing the trim table recording the at least one special type data of the physical erasing units of the first group in the flash memory module and regrouping the physical erasing units of the first group to the second group; and
   if the number of invalid data of one of the physical erasing units of the second group is greater than the predetermined value, selecting one of the physical erasing units from the second group as the first physical erasing unit.

4. The method according to claim 1, further comprising:
   performing a writing operation to write a write data into a third physical erasing unit among the physical erasing units; and
   grouping the third physical erasing unit to the first group.

5. The method according to claim 1, wherein the predetermined value is ⅕ the number of the physical programming units in each of the physical erasing units.

6. The method according to claim 1, wherein each bit of the special type data is equal to 0.

7. A flash memory controller for controlling a flash memory module, comprising:
   a host interface configured to couple to a host system;
   a memory interface configured to couple to the flash memory module, wherein the flash memory module has a plurality of physical erasing units, each of the physical erasing units has a plurality of physical programming units, and the physical erasing units are grouped into at least a data area and a spare area; and
   a memory management circuit coupled to the host interface and the memory interface,
   wherein the memory management circuit is configured to group the physical erasing units in the data area to at least a first group and a second group, wherein a trim table recording at least one special type data of the physical erasing units of the first group is not stored in the flash memory module, and a trim table recording at least one special type data of the physical erasing units of the second group is stored in the flash memory module,
   wherein the memory management circuit is further configured to perform a valid data merging operation to select a first physical erasing unit from the second group,
   wherein the memory management circuit is further configured to copy a plurality of valid data of the first physical erasing unit to a second physical erasing unit among the physical erasing units in the spare area and re-associate the first physical erasing unit to the spare area,
   wherein the memory management circuit is further configured to perform an erasing operation on the first physical erasing unit.

8. The flash memory controller according to claim 7, wherein in the operation of the memory management circuit selecting the first physical erasing unit from the second group,
   the memory management circuit is further configured to determine whether a number of the physical erasing units of the second group is equal to 0,
   if the number of the physical erasing units of the second group is equal to 0, the memory management circuit stores the trim table recording the at least one special type data of the physical erasing units of the first group in the flash memory module, and regroups the physical erasing units of the first group to the second group,
   if the number of the physical erasing units of the second group is not equal to 0, the memory management circuit selects a physical erasing unit from the second group as the first physical erasing unit.

9. The flash memory controller according to claim 7, wherein in the operation of the memory management circuit selecting the first physical erasing unit from the second group, the memory management circuit is configured to record a number of invalid data of each of the physical erasing units of the second group, if the number of invalid data of each of the physical erasing units of the second group is not greater than a predetermined value, the memory management circuit stores the trim table recording the at least one special type data of the physical erasing units of the first group in the flash memory module, and regroups the physical erasing units of the first group to the second group, if the number of invalid data of one of the physical erasing units of the second group is greater than the predetermined value, the memory management circuit selects one of the physical erasing units from the second group as the first physical erasing unit.

10. The flash memory controller according to claim 7, wherein the memory management circuit is further configured to perform a writing operation to write a write data into a third physical erasing unit among the physical erasing units, and the memory management circuit is further configured to group the third physical erasing unit to the first group.

11. The flash memory controller according to claim 7, wherein the predetermined value is ⅕ the number of the physical programming units in each of the physical erasing units.

12. The flash memory controller according to claim 7, wherein each bit of the special type data is equal to 0.

13. A flash memory storage apparatus, comprising:
a connector configured to couple to a host system;
a flash memory module having a plurality of physical erasing units, wherein each of the physical erasing units has a plurality of physical programming units, and the physical erasing units are grouped into at least a data area and a spare area; and
a flash memory controller coupled to the connector and the flash memory module,
wherein the flash memory controller is configured to group the physical erasing units in the data area to at least a first group and a second group, wherein a trim table recording at least one special type data of the physical erasing units of the first group is not stored in the flash memory module, and a trim table recording the at least one special type data of the physical erasing units of the second group is stored in the flash memory module,
wherein the flash memory controller is further configured to perform a valid data merging operation to select a first physical erasing unit from the second group,
wherein the flash memory controller is further configured to copy a plurality of valid data of the first physical erasing unit to a second physical erasing unit among the physical erasing units in the spare area and re-associate the first physical erasing unit to the spare area,
wherein the flash memory controller is further configured to perform an erasing operation on the first physical erasing unit.

14. The flash memory storage apparatus according to claim 13, wherein in the operation of the flash memory controller selecting the first physical erasing unit from the second group, the flash memory controller is further configured to determine whether a number of the physical erasing units of the second group is equal to 0, if the number of the physical erasing units of the second group is equal to 0, the flash memory controller stores the trim table recording the at least one special type data of the physical erasing units of the first group in the flash memory module, and regroups the physical erasing units of the first group to the second group, if the number of the physical erasing units of the second group is not equal to 0, the flash memory controller selects a physical erasing unit from the second group as the first physical erasing unit.

15. The flash memory storage apparatus according to claim 13, wherein in the operation of the flash memory controller selecting the first physical erasing unit from the second group, the flash memory controller is configured to record a number of invalid data of each of the physical erasing units of the second group, if the number of invalid data of each of the physical erasing units of the second group is not greater than a predetermined value, the flash memory controller stores the trim table recording the at least one special type data of the physical erasing units of the first group in the flash memory module, and regroups the physical erasing units of the first group to the second group, if the number of invalid data of one of the physical erasing units of the second group is greater than the predetermined value, the flash memory controller selects one of the physical erasing units from the second group as the first physical erasing unit.

16. The flash memory storage apparatus according to claim 13, wherein the flash memory controller is further configured to perform a writing operation to write one write data into a third physical erasing unit among the physical erasing units, and the flash memory controller is further configured to group the third physical erasing unit to the first group.

17. The flash memory storage apparatus according to claim 13, wherein the predetermined value is ⅕ the number of the physical programming units in each of the physical erasing units.

18. The flash memory storage apparatus according to claim 13, wherein each bit of the special type data is equal to 0.

* * * * *